United States Patent [19]

Scholz

[11] 4,259,993
[45] Apr. 7, 1981

[54] CERAMIC-INSULATED PIPE FOR THE TRANSPORT OF HOT FLUIDS

[75] Inventor: Franz Scholz, Jüchen, Fed. Rep. of Germany

[73] Assignee: Kernforschungsanlage Jülich Gesellschaft mit beschrankter Haftung, Jülich, Fed. Rep. of Germany

[21] Appl. No.: 95,422

[22] Filed: Nov. 19, 1979

Related U.S. Application Data

[63] Continuation of Ser. No. 924,717, Jul. 14, 1978, abandoned.

[30] Foreign Application Priority Data

Jul. 26, 1977 [DE] Fed. Rep. of Germany ....... 2733611

[51] Int. Cl.³ .............................................. F16L 9/22
[52] U.S. Cl. .................................... 138/149; 138/143; 138/155; 138/176; 176/87
[58] Field of Search ............... 138/142, 143, 149, 155, 138/172, 176, 178; 176/87

[56] References Cited

U.S. PATENT DOCUMENTS

| 1,696,725 | 12/1928 | Murray | 138/142 X |
| 2,652,943 | 9/1953 | Williams | 138/142 X |
| 3,056,183 | 10/1962 | Pigeot | 138/176 X |
| 3,136,036 | 9/1964 | Dobell | 138/172 X |
| 3,156,091 | 11/1964 | Kraus | 138/155 X |
| 3,587,659 | 6/1971 | Breitfuss | 138/172 |
| 3,901,539 | 8/1975 | Ijerman | 138/155 X |
| 4,010,775 | 3/1977 | Roberts | 138/142 |

FOREIGN PATENT DOCUMENTS

| 260898 | 11/1926 | United Kingdom | 138/172 |
| 905268 | 9/1962 | United Kingdom | 138/172 |
| 296015 | 12/1978 | United Kingdom | 138/172 |

Primary Examiner—James E. Bryant, III
Attorney, Agent, or Firm—Karl F. Ross

[57] ABSTRACT

A ceramic-lined pipe for hot fluids, e.g. gases or liquids from high-temperature nuclear reactors or within such reactors, comprises an outer metal-wall pipe formed internally with a lining of ceramic. The ceramic lining is constituted of a ceramic inner shell surrounded by a stress-absorbing reinforcing element in the form of a multiplicity of wires or cables or a sleeve. The reinforcing member stresses the ceramic body inwardly by way of compensation to the tensile stress caused by the thermal expansion of the ceramic inner shell and is sealed against the metal pipe wall directly or through the intermediary of another tubular member.

2 Claims, 6 Drawing Figures

CERAMIC-INSULATED PIPE FOR THE TRANSPORT OF HOT FLUIDS

This is a continuation of application Ser. No. 924,717, filed July 14, 1978 now abandoned.

FIELD OF THE INVENTION

The present invention relates to a ceramic-lined pipe for hot fluids and, more particularly, a pipe insulated along its interior with a ceramic body through which hot fluids, e.g. gases or liquids of a nuclear reactor, can be passed. The ceramic-lined pipe can be used wherever hot fluids under pressure must be transported.

BACKGROUND OF THE INVENTION

Internally insulated pipes for the transport of high temperature fluids, e.g. gases or liquids, generally are constituted of a metallic material which must be protected from the fluid transported through the pipe against overheating. This is especially the case in nuclear reactor applications where failure of the metallic member of the pipe may be detrimental to the environment, to operating personnel and to the equipment of the nuclear reactor.

This is particularly the case when the hot fluid is under pressure and the passage of the hot fluid through the pipe places the latter under substantial stress or loading.

In general, the internally lined pipes used heretofore for such purposes are formed internally with ceramic foils or fibrous material, as well as solid ceramic linings, the latter being especially useful for reinforced concrete vessels or ducts.

Ceramic inner linings of pipes and other vessels have hitherto encountered two basic problems.

Since it is desired that the lining create a significant temperature gradient between its internal surface and its external surface surrounded by the metallic conduit, significant tension stresses develop along the outer or cold side of the insulation which frequently cannot be withstood by the ceramic material and thus there is a tendency for cracks to form in the ceramic material. The danger of such crack formation with ceramic internal linings for conduits and the like is especially pronounced when the temperature gradient is very high and it has been proposed to avoid such crack formation by subdividing the ceramic internal lining into a plurality of segments. However, when such segments are used, there is a possibility that gas will pass through the spaces between the segments or along the interfaces between adjoining segments and thus reduce the reliability of the insulation and the insulation effectiveness.

Even where such segments are not provided, there is always the danger that the fluid will flow between the inner insulation and the outer wall of the lined duct. Such undesired gas flow also adversely affects the insulation efficiency and is frequently uncontrollable so that locally high temperatures may be experienced at the outer wall of the pipe and may be detrimental to the latter, affecting the useful life of the pipe. In addition, unpredictable forces may develop at the outer metallic pipe wall which can cause rupture thereof, especially if temperature fluctuations cause degradation of the metal material.

OBJECTS OF THE INVENTION

It is the principal object of the invention to provide a lined duct in which the aforedescribed disadvantages are avoided and which can be used for the transport or passage of high-temperature fluids at high fluid pressures.

Another object of the invention is to provide a duct for the purposes described which is of relatively simple and inexpensive construction and is capable of withstanding high fluid pressures as well as high axial flow-pressure losses.

A further object of the invention is to provide a lined duct which is free from the disadvantages of earlier insulated-pipe systems using ceramic inner linings and which precludes localized overheating of the outer metallic member.

SUMMARY OF THE INVENTION

These objects and others which will become apparent hereinafter are attained, in accordance with the present invention, with a lined duct comprising an outer metallic conduit and an inner hollow ceramic body constituting a lining for the passage formed internally of the duct. According to the invention, this ceramic tubular body is externally reinforced by an annular outer reinforcing element which, in the absence of fluid pressure, applies inward radial prestressing forces adapted to withstand the subsequently developed tensile stress and which is sealed in a gas-tight manner and circumferentially or peripherally to the metallic pipe surrounding same.

The inward prestress is so determined that the insulating ceramic body is not subjected to significant tensile forces along its outer periphery or any tensile stresses which may develop are counterbalanced or rendered of insignificant effect so that they do not tend to damage or form cracks in the tubular ceramic body.

Upon the passage of a high temperature fluid through the duct, this inner lining yields or expands outwardly so that it is pressed with greater force against the reinforcing element which increases the pressure applied by the latter to the ceramic body. The parasitic gas flows in the space between the ceramic body and the inner surface of the surrounding pipe are minimized by the seals of the axial sections of the lining to the inner pipe wall while escape of fluid into the space is minimized by the presence of the surrounding reinforcing element for each of the axial lining sections. As a result, the insulation effectiveness of the ceramic body is increased.

According to a further feature of the invention, the inward stressing elements surrounding the tubular ceramic body are rings or sleeves which are shrunk onto the latter. These rings or sleeves, which may be composed of steel and are shrunk onto the ceramic body which may be composed of aluminum oxide, magnesium oxide or silicon dioxide ceramics or "Kohlestein," enable the tubular ceramic body to be constituted of a plurality of interfitted segments without the danger that such parasitic gas streams can form or be detrimental.

In regions in which the axial lengths of the ceramic body are connected to the surrounding metal pipe, the rings can be sealed hermetically to this outer pipe, e.g. by welding, and such welded seals may also be provided at all pipe connections. The welds are facilitated if an intermediate wall is provided between the outer pipe and the ceramic inner lining.

In the latter case, the intermediate wall can be welded to the outer pipe and then welded to the reinforcing ring or sleeve. The intermediate wall can be a thin-walled steel tube which is secured to the outer pipe, e.g. by welding, before this pressure-sustaining member is subjected to annealing or other heat treatment to relieve internal stresses and thereby increase its ability to withstand pressure.

According to another feature of the invention, which is especially applicable when lower pressures of the fluid to be transported are to be withstood by the lined conduit or duct, the reinforcing element may be the outer wall of the duct. In other words, in this case, the outer sheaths of steel reinforcing can be welded together to form a continuous pipe surrounding the ceramic lining. The successive rings or sleeves are then welded together or otherwise connected in a hermetical gas-tight manner.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
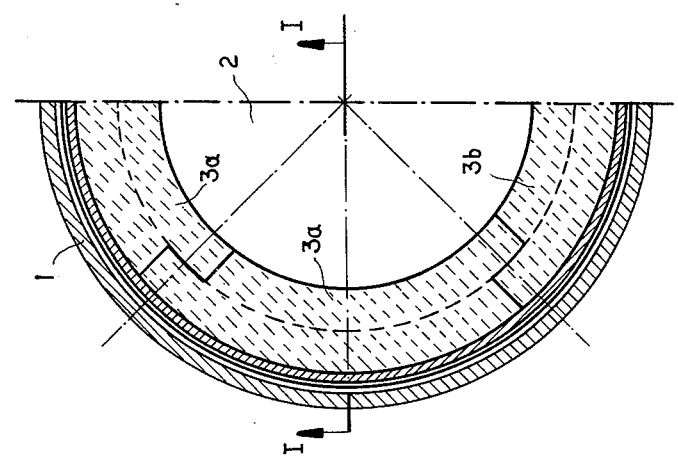
FIG. 2 is a section taken generally along the line II—II of FIG. 1.
Figure 1:
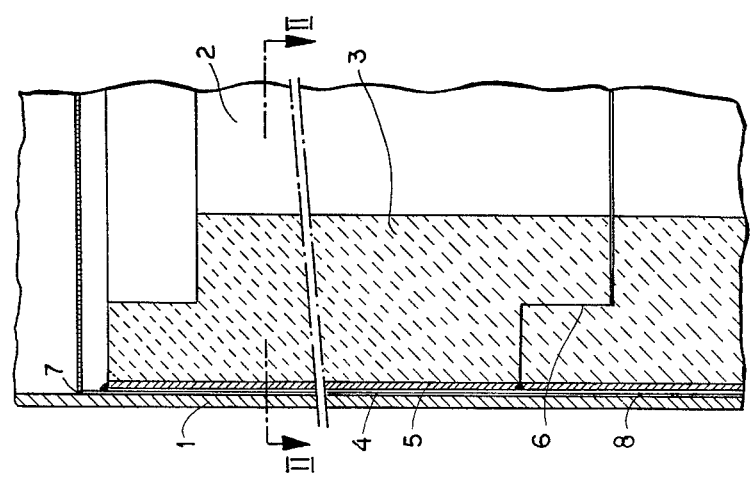
FIG. 1 is a partial axial section, generally along the line I—I of FIG. 2 through a ceramic-lined duct in accordance with the present invention.
Figure 6:
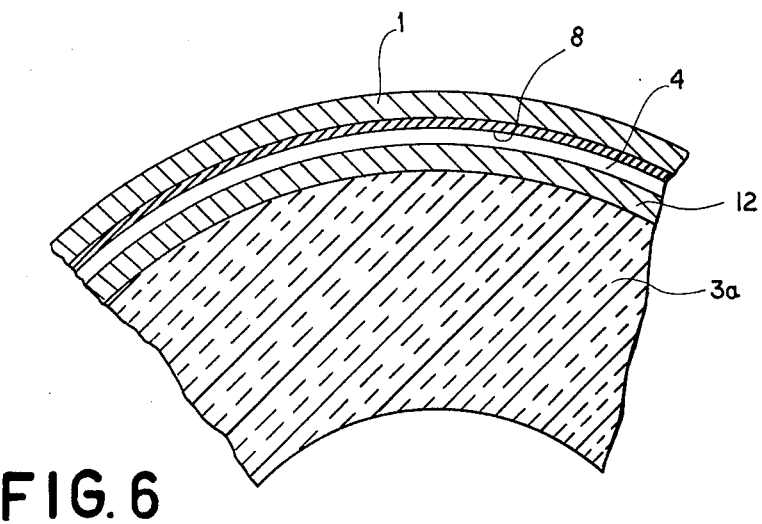
FIG. 6 is a detail view generally similar to FIG. 2 but drawn to a greatly enlarged scale, illustrating features of the invention.

As can be seen from FIGS. 1, 2 and 6, a duct for the transport of high-temperature and high-pressure fluids, especially for gases or liquids in or to or from a nuclear reactor can comprise an outer wall 1 constituted as a heat-treated or annealed pressure-sustaining steel pipe within which a continuous flow path 2 for the fluid is formed. The flow path for the fluid is defined by and surrounded by a ceramic insulating body generally represented at 3 which is tubular and is closely surrounded by the pipe 1, being connected thereto in the manner described above. As noted, the outer member 1 can be a steel pipe which has been stress relieved by annealing.

The inner insulation as shown in the drawings by way of example is formed from a plurality of segments (see FIG. 4) to provide tubular members which are axially interfitted. The inner insulation may be also formed as a single piece.

As can be seen in FIG. 2, a multiplicity of such segments 3a, 3b, 3c are interfitted to form a continuous sleeve or tube.

Between the ceramic insulating body and the outer wall, there is provided an intermediate all around gap 4, generally in the form of a space of small radial dimension. The radial width of this space may be less than the thickness of the pipe 1 and a small fraction of the thickness of the ceramic body 3.

The ceramic hollow body is formed externally, i.e. along its surface turned toward the outer wall 1, with inward prestressing elements 5 shown in FIGS. 1, 2 and 6 as a sleeve of steel which is heated and placed over the ceramic body being thereupon cooled so as to be shrunk onto the latter. The hollow body is thereby prestressed inwardly with a pressure capable of withstanding the tensile stress caused by the thermal expansion of the ceramic body 3.

Figure 5:
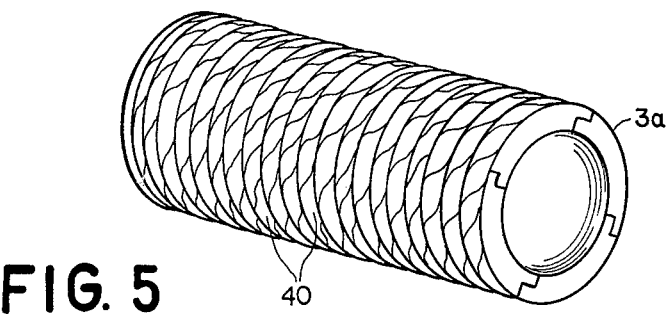
FIG. 5 is a perspective view of a length of inner lining adapted to be mounted in a pressure-sustaining pipe, according to yet another feature of the invention.

As can be seen in FIG. 5, the inward prestressing element can be steel wire or cable which can be wound around the ceramic body. Here the cable is represented at 40.

In the embodiment of FIGS. 1, 2 and 6, however, the inward prestressing elements 5 are rings or sleeves which form a closed hollow cylindrical insulating member adapted to be fitted into the pipe 1. The insulating members thus constituted may have forwardly projecting annular tongues which are received in annular recesses formed at the rear end of each succeeding tubular member. This tongue and recess formation arrangement has been represented at 6 and assures axial alignment of the successive sections of the hollow member.

To prevent axial gas flow in the intermediate space 4 the stressing elements 5 are hermetically welded to the outer wall 1 or to an intermediate wall 8 with annular welds 7 shown in FIG. 1.

So as to avoid damage to the outer pipe by the welding, the outer pipe 1 may be equipped with a thin inner tubular member 8 constituting an intermediate wall. The intermediate wall 8 can be welded to the outer pipe member by welds 7' prior to the annealing thereof so as to protect the outer member against damage by the weld between the reinforcing element 5 and this intermediate wall. The intermediate wall 8 also reduces the convective movements of fluid within the space 4 and thus the transfer of heat to the outer wall.

Figure 3:
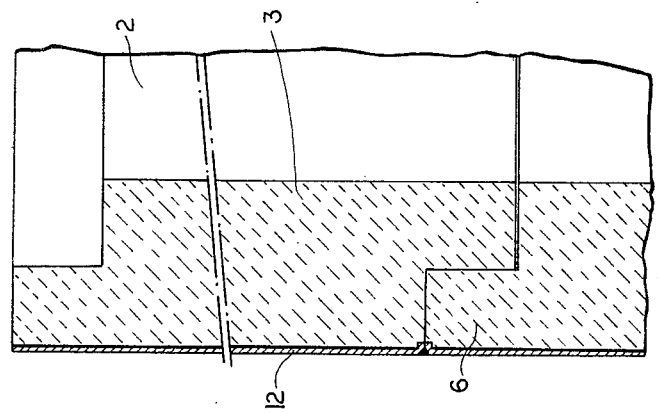
FIG. 3 is a view similar to FIG. 1 illustrating another embodiment of the present invention especially adapted for the transport of fluids of lower pressure.

FIG. 3 shows a pipe which can be used for lower pressure fluids and in which the sleeves 12 which are shrunk onto the ceramic bodies 3 are welded together to form the outer sheath for the lined pipe. In this case, the continuously welded sleeves act both as the inward reinforcement and stressing elements and the outer casing of the pipe.

Figure 4:
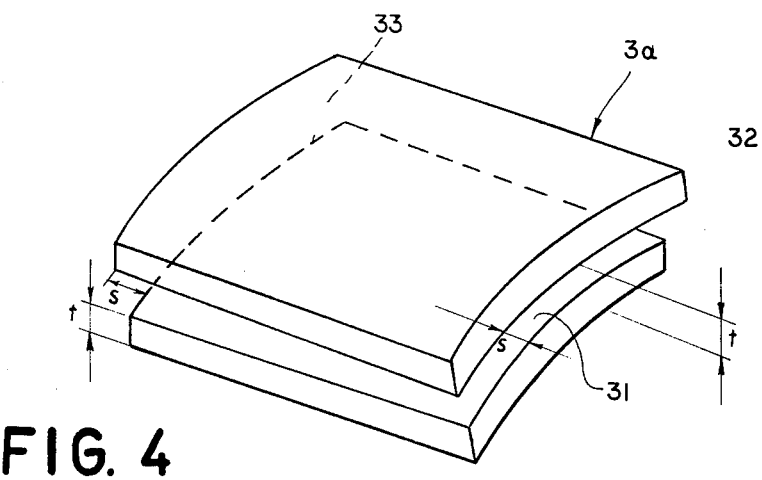
FIG. 4 is a perspective view of a pipe segment for use in the system of FIGS. 1-3.

As can be seen from FIG. 4, each of the ceramic segments, e.g. the segment 3a, can be formed with an axially extending lip 31 adapted to be received in the space 33 and a peripherally extending lip 30 adapted to be received in the space 32, thereby enabling these segments to be fitted together peripherally and axially. The thickness t of the lips 30 and 31 can be equal to the height of the space 32 and 33, respectively, while the axial dimension S of the lip 31 can be equal to the axial depth of the space 33.

I claim:
1. A duct for the transport of high-temperature fluids, comprising:
   a continuous metal outer pipe;
   a tubular ceramic body received in said outer pipe but circumferentially spaced therefrom and defining a passage within said body for said fluid;
   a plurality of annular metallic stressing elements extending circumferentially around and exerting inward prestress upon said ceramic body resisting the application of outward pressure by said fluid to said body, said elements being disposed inwardly of said pipe, said body and said elements together constituting a tubular member received within said pipe with all around clearance;

an intermediate cylindrical metal sleeve disposed between said pipe and said member over at least the full length of said member and axially extending over a plurality of said elements and surrounding said body;

first circumferential welds formed between opposite ends of said sleeve and said pipe, thereby securing said sleeve to said pipe and preventing parasitic fluid flow between said pipe and said sleeve; and respective second circumferential welds between said elements and said sleeve, thereby mounting said member within said sleeve and thus mounting said member via said intermediate sleeve within said pipe while preventing parasitic fluid flow between said member and said sleeve.

2. The duct defined in claim 1 wherein each of said elements is a cylindrical member shrunk onto a respective portion of said ceramic body, further weld seams joining said cylindrical members contiguously along the length of said tubular member, said ceramic body being formed from a multiplicity of interfitting cylindrical segments.

* * * * *